Aug. 30, 1966  R. A. MATTHEWS ET AL  3,269,422
COMPOSITE TUBING PRODUCT AND APPARATUS AND METHOD
FOR MANUFACTURING THE SAME
Filed Jan. 9, 1963  3 Sheets-Sheet 1
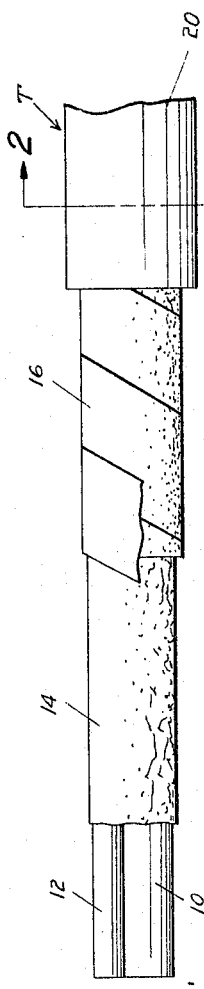
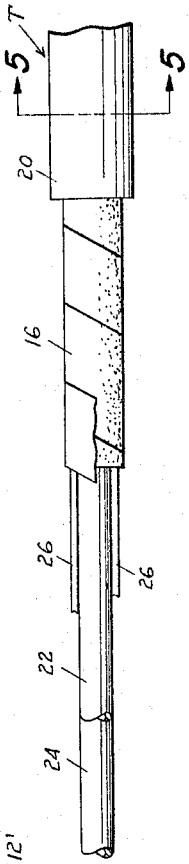
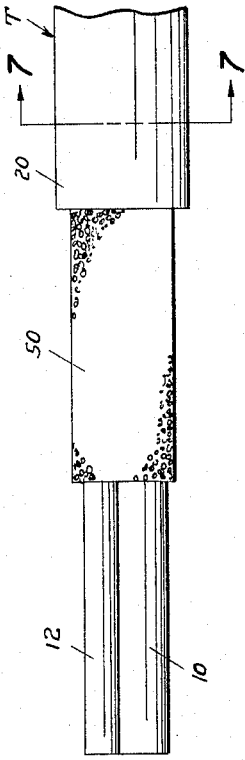
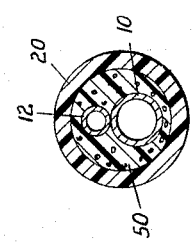
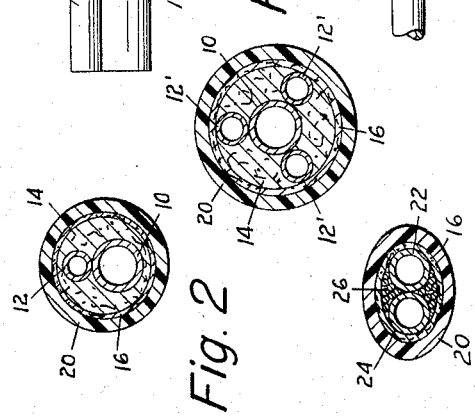
INVENTORS
RICHARD A. MATTHEWS
BY HANS A. JOHANSEN
ATTORNEYS

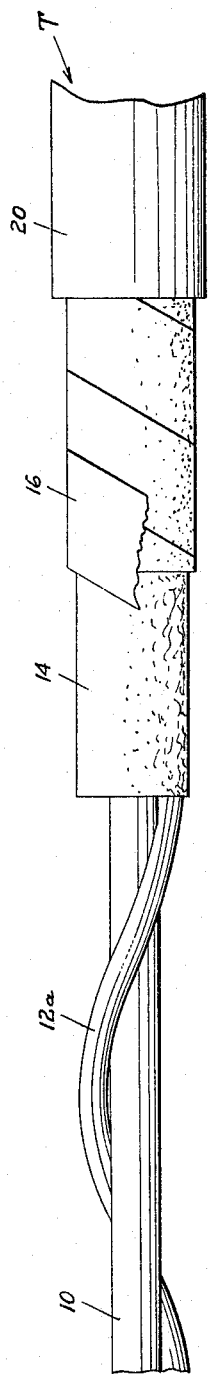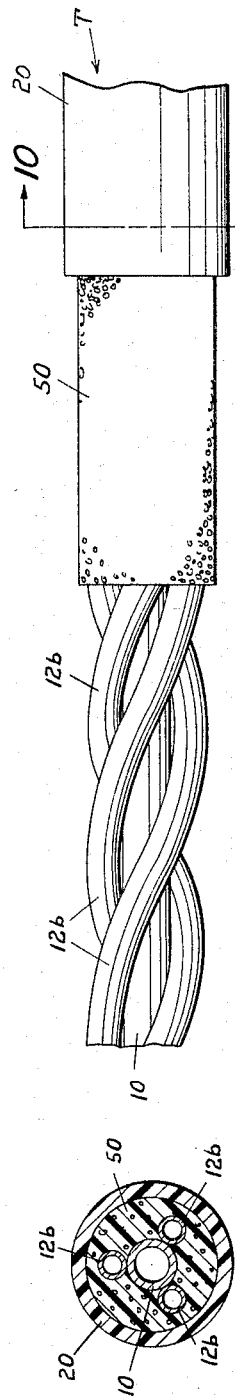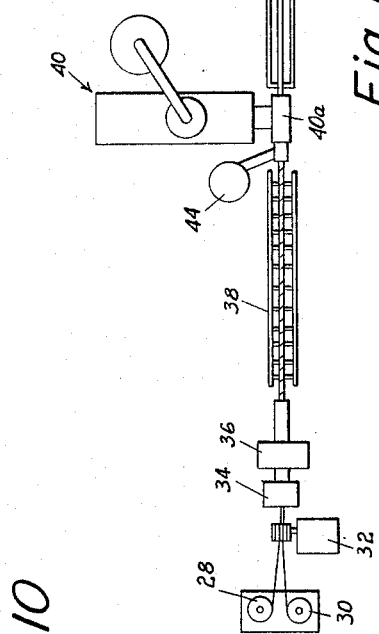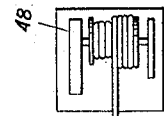

Aug. 30, 1966  R. A. MATTHEWS ET AL  3,269,422
COMPOSITE TUBING PRODUCT AND APPARATUS AND METHOD
FOR MANUFACTURING THE SAME
Filed Jan. 9, 1963                                3 Sheets-Sheet 3
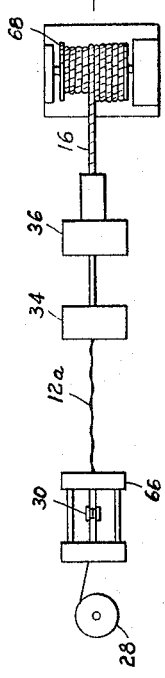
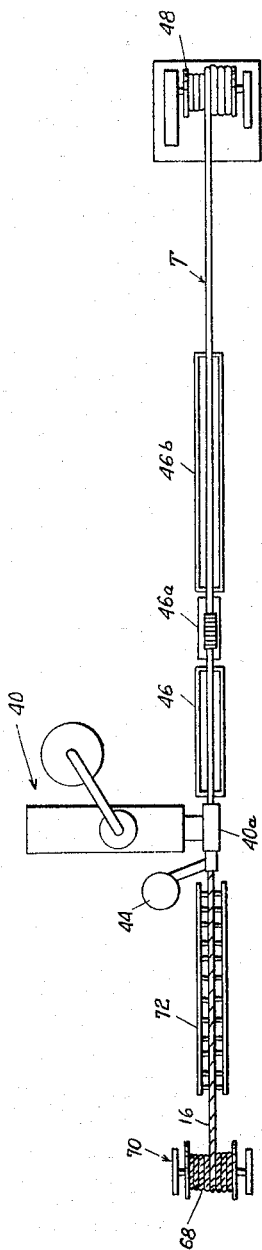
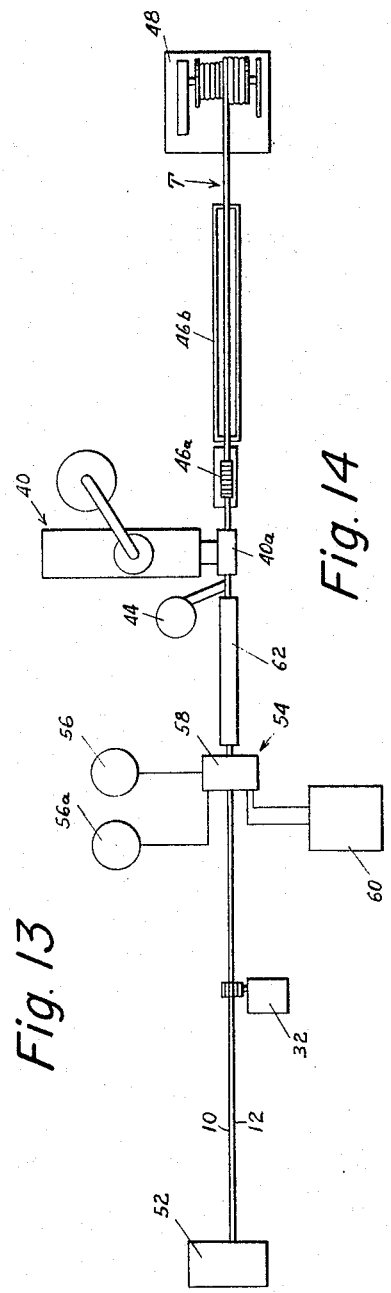
INVENTORS
RICHARD A. MATTHEWS
BY HANS A. JOHANSEN
ATTORNEYS United States Patent Office 3,269,422
Patented August 30, 1966

3,269,422
COMPOSITE TUBING PRODUCT AND APPARATUS AND METHOD FOR MANUFACTURING THE SAME
Richard A. Matthews, Chagrin Falls, and Hans A. Johansen, Mantua, Ohio, assignors to Samuel Moore and Company, Mantua, Ohio, a corporation of Ohio
Filed Jan. 9, 1963, Ser. No. 250,390
12 Claims. (Cl. 138—111)

This invention relates in general to composite tubing and apparatus and method for manufacturing the same, and more particularly to a composite tubing construction which is adapted for use in conveying a fluid, either liquid or gas, from one point to another, and at the same time maintaining the temperature of the conveyed fluid substantially constant.

This type of a tubing finds its principal use in the chemical processing and petroleum refining industries, and is used, for example, for conveying a sample of fluid from a process line, or a reaction vessel, to an automatic instrument, such as a continuous sampling instrument— for example a chromatograph or infra-red spectograph. Samples of the fluid taken under these conditions generally must be maintained at a relatively elevated temperature, because the viscosity of the fluid must be kept as low as possible, and moreover in case of a gas sample being transmitted, the gaseous sample must not be permitted to condense.

At the present time these sampling lines are oftentimes made up at the site, by supporting a steam carrying copper pipe from a point of sampling, to the instrumentation that is adapted to receive the sample, and then utilizing a sample tube of stainless steel for transmitting the sample, and bending the stainless steel tube in appropriate places for clamping to the supporting heating tube. The overall structure is then generally coacted with a cement such as for instance "Thermon" and may be wrapped with insulation, such as cork or the magnesia-type, for maintaining the temperature of the sampling tube. Oftentimes, the entire structure is then wrapped with a metal tape, or covered with pitch, in order to protect it from weather conditions.

This type of structure, is extremely expensive and difficult to lay out, and moveover in the event of any difficulties with the sampling structure, it is almost impossibe to repair, and therefore is generally completely torn out, and completely replaced in the event of any such trouble. Also because of the custom made construction, the heat conductivity from one end of the sampling structure to the other may not be uniform, and often results in cold spots. Accordingly, such custom made sampling structure has not been completely satisfactory, so far as industry is concerned.

The instant invention provides a mass produced composite tubing particularly adapted for use for instance in sampling work, which may be readily installed, which is of uniform construction from one end thereof to the other end thereof, and therefore will provide more uniform and accurate results from the use of the tubing, and which composite tubing is much more economical as compared to the heretofore used custom made arrangements.

Briefly, the tubing product comprises a heat tube and a sampling tube disposed in engagement, and about which is provided an insulating barrier, which in turn is covered with a sheath of flexible plastic material, and which composite tubing product may be expeditiously installed for use, for example, as sampling tubing.

Accordingly, an object of the invention is to provide a novel composite tubing product.

Another object of the invention is to provide a composite tubing which is adapted for use as sampling tubing, and which is relatively easy to bend to the desired configuration, for extending from the point of sampling to instrumentation for handling the sample taken by the tubing, and wherein the tubing is of a uniform construction through out its length for providing consistent and accurate results from the sample taken.

Another object of the invention is to provide a novel composite tubing for sampling fluids comprising, a heat line and a sampling line disposed in juxtaposed relation, with a thermo barrier encompassing the lines, and a flexible sheath of plastic material encompassing the thermo barrier and the lines.

A still further object of the invention is to provide a novel method of producing composite tubing of the above type.

A further object of the invention is to provide apparatus set up in a novel organized system, for the production of the above described composite tubing.

Other objects and advantages of the invention will be apparent from the following description taken in conjunction with the accompanying drawings, wherein:

FIG. 1 is a partially cut away elevational view of a composite tubing product produced in accordance with the instant invention;

FIG. 2 is a transverse cross-sectional view taken generally along the plane of line 2—2 of FIG. 1 looking in the direction of the arrows;

FIG. 3 is a sectional view generally similar to that of FIG. 2, but illustrating a modification of the FIGS. 1 and 2 arrangement;

FIG. 4 is a partially cut away elevational view of a modified form of composite tubing product as compared to that of FIGS. 1, 2 and 3;

FIG. 5 is a transverse sectional view taken generally along the plane of line 5—5 of FIG. 4, looking in the direction of the arrows;

FIG. 6 is a partially cut away elevational view illustrating another embodiment of composite tubing product;

FIG. 7 is a transverse sectional view taken generally along the plane of line 7—7 of FIG. 6, looking in the direction of the arrows;

FIG. 8 is a partially cut away elevational view of another embodiment of the composite tubing product of the invention;

FIG. 9 is a partially cut away elevational view of a further modification of composite tubing product made in accordance with the invention;

FIG. 10 is a transverse sectional view taken generally along the plane of line 10—10 of FIG. 9, looking in the direction of the arrows;

FIG. 11 is a more or less diagrammatic, top plan view of apparatus disposed in an organized system, for producing the composite tubing products illustrated for instance in FIGS. 1 to 5 inclusive;

FIGS. 12 and 13 are top plan, generally diagrammatic views of apparatus disposed in an organized system for producing the embodiment of the composite tubing illustrated for instance in FIG. 8;

FIG. 14 is a top plan, generally diagrammatic illustration of apparatus disposed in an organized system for producing the tubing embodiment illustrated for instance in FIGS. 6 and 7 of the drawings, and more particularly a tubing embodying an expanded foam type of thermo barrier.

Referring now to the drawings, and more particularly to FIGS. 1 and 2 thereof, there is shown a piece of composite tubing T comprising a sampling or control line 10 and a heating line 12 running parallel to the control line 10, and disposed in abutting contact therewith. The sampling line 10 may be formed, for instance, of metallic material, such as stainless steel, and the heating line may be formed of a good heat transmitting, anti-corrosion metallic material, such as for instance copper. The heating line 12 is adapted to carry, for instance steam. Encompassing the heating and sampling lines may be a layer 14 of filler material to give a generally cylindrical or uninterrupted configuration to the bundle of juxtaposed lines 10 and 12.

The layer 14 of filler material may be formed of fibrous material, such as for instance, jute, or other filamentary material, and may be somewhat heat insulating. The lines 10 and 12 of filler material are then wrapped with a good thermo barrier 16, such as for instance a laminated Dacron-asbestos tape known as Mylar and having good heat insulating characteristics. Dacron, a trademark, is a synthetic polyester fiber produced by the condensation of terephthalic acid and ethylene glycol. Mylar, a trademark, is a polyethyleneterephtholate polyester film of tough, strong characteristics. This wrap is preferably applied in the overlapping spiral fashion illustrated in FIG. 1, and then the wrapping 16 is covered with an outer sheath or jacket 20 of flexible plastic material, to add to the corrosion resistance of the composite tubing and prevent weathering of the materials making up the composite tubing. This outer jacket may be formed of any suitable flexible plastic material, such as for instance the polyvinyl chlorides, polyethylenes, polyurethenes, neoprenes, or fluorocarbons (e.g. Teflon).

FIG. 3 illustrates a form of composite sampling tubing similar to that of FIGS. 1 and 2, except that there has been provided a plurality, and more particularly three, heating tubes or lines 12' disposed symmetrically about the sampling tube 10 and in intimate contact therewith, for increased and more uniform heating of the sampling tube. It will be understood that while only one sampling line has been illustrated, that the composite tubing could also include a plurality of such sampling lines.

Referring now to FIGS. 4 and 5, there is shown a composite sampling tubing comprising a sampling tube 22 and a juxtaposed heating tube 24. The sampling tube may be formed of conventional stainless steel, and the heating tube of copper for transmitting steam therethrough. A plurality of preferably good heat transmitting elongated elements, such as copper wires or rods 26, are disposed in the valleys defined between the juxtaposed tubes 22 and 24, for generally rounding out the configuration of the line bundle 22 and 24 into a generally oval-shaped, and then the heat insulating wrap material 16 or thermo barrier is wound around such configuration, and in the same general manner as aforedescribed in connection with FIGS. 1 to 3. Then, the whole package is jacketed in the outer plastic sheath material 20.

Referring now to FIG. 11, there is diagrammatically illustrated apparatus set up in an organized system for producing the tubing shown for instance in FIGS. 1 to 5 of the drawings. Such apparatus may comprise a reel 28 of the sampling tubing 10 or 22 and a reel 30 of the heating tubing 12 or 24. It will be understood, of course, that if more heating line runs are utilized, in the composite sampling tubing than one, and as for instance the three runs illustrated in FIG. 3, then more reels of the heating tubing disposed about the reel of the sampling tubing will be required.

The heating and sampling lines may be moved through a straightener 32 which may consist merely of a powered rotatable grooved cylindrical member, for moving and straightening the tubing from the reels, and then the tubing disposed in juxtaposed relation may be moved through a conventional filler applying mechanism 34 for applying the flexible filler material 14 to the tubing. This mechanism 34 may include means for chopping up fibers, for instance if the fibers are comprised of fiberglass or the like, and for mixing such fibers with a suitable adhesive material as is conventionally known in the fiber art, and then applying the fibrous materials as by blowing or laying it down in a suitable manner about the associated sampling and heating lines 10 and 12 to produce the uninterrupted suface configuration. The fiber coated tubing may then be passed through a conventional taping mechanism 36 for applying the thermo barrier 16 thereto, and at which time the asbestos-Dacron tape is wound about in overlapping relation the filler layer 14. The wrapped tubing may then be moved on the conventional roller conveyor 38 through a conventional extruding mechanism 40, including cross head 40a, where the hot plastic material is applied to form the flexible outer sheath 20 of the composite tubing. There may also be provided in conjunction with mechanism 40, a conventional vacuum unit 44, for sizing the outer sheath and maintaining a predetermined thickness thereof on the thermo barrier layer 16. From the cross head 40a of the extruder, the hot tubing may move first into a preliminary cooling tank 46 filled with, for instance, water, for setting the plastic material forming the outer sheath 20, and then a haul-off mechanism 46a of any suitable type and as for instance the well known caterpillar type, may be utilized to move the tubing into a further main cooling tank 46b for cooling and curing of the tubing adequately for winding it upon reel mechanism 48 where it is ready for use.

If the composite tubing is of the type illustrated for instance in FIGS. 4 and 5, and not having the fibrous filler layer 14, then station 34 will apply the filler wires or rods 26, which wires may be mounted upon reels, and moved with or layed down in the valleys between the sampling and the heating lines to give a more uninterrupted surface to the line bundle as well as more uniform heat transfer.

Referring now to FIGS. 6 and 7, there is illustrated a composite sampling tubing wherein instead of having the thermo barrier layer formed by a wrap of asbestos and Dacron tape, the thermo barrier 50 is provided by a cured expanded foam material, such as for instance cured polyurethane foam, which is of high heat insulating character. In other respects, this composite tubing is generally similar to the first described embodiments.

The polyurethane foam could be performed, having apertures running therethrough for receiving therein in cured condition, the sampling line 10 and the heating line 12, or the polyurethane foam material may be mixed up and applied in the tubular liquid or gel form before the foam sets.

Referring to FIG. 14, there is illustrated diagrammatically, apparatus set up in an organized system, for providing the foamed thermo barrier layer 50 of FIGS. 6 and 7. The sampling and heating lines 10 and 12 are moved from a pay-off station 52 through the straightener 32, to station 54 where the expanded foam thermo barrier 50 may be applied. Such station may include holding tanks 56, 56a for respectively the prepolymer and the catalyst or chain extender, and a mixing head 58 together with a control panel and metering pump 60, all conventional mechanism utilized in the production of expanded polyurethane foam. The foam is applied to the juxtaposed sampling and heating lines in head 58 after mixing and foaming of the prepolymer and catalyst, and the foam coated tubing may pass through a drying mechanism 62 for positively setting and curing the foam, on the sampling and heating lines. Thereupon, the foam coated lines are passed through the aforedescribed extruding mechanism 40 which applies the external plastic sheath 20 to the composite tubing, and then such tubing may be passed through a conventional cooling tank to adequately cool the outer sheath, for winding upon a coiler 48 for shipment or storage. This extruding mechanism does not embody a preliminary cooling tank as that identified by numeral 46 in the FIG. 11 arrangement, since the sheath material may adequately set upon extrusion at head 40a, for coaction with haul-off 46a.

FIG. 8 illustrates a modification of the invention wherein the heating line 12a is wound in spiral form about the sampling line in intimate contact therewith, instead of having the heating line running linearly. Such an arrangement will give a generally more uniform degree of heating of the sampling line. In other respects the FIG. 8 is generally similar to that aforediscussed in connection with FIGS. 1 and 2.

Referring to FIGS. 12 and 13, there is illustrated apparatus for forming the spiral wound heating line arrangement illustrated in FIG. 8, and wherein the coil 28 of sampling line 10 is fed through a conventional cabling machine 66 having a reel 30 of heating line which spirals the heating line 12a about the sampling line and then passes the material to the filler layer applying mechanism 34 and the taping machine 36 similarly as in the first described embodiment. The tubing may then be wound upon a reel 68 and then the reel 68 may be transferred to pay-off station 70 where the tubing may be fed to a conveyor 72 and then through extrusion mechanism 40 in a similar manner as aforedescribed for the first embodiment. While the mechanism or apparatus for producing the spirally wound heating line type of composite tubing has been shown in two distinct steps, it will be understood that such apparatus could be disposed in an aligned condition for the continuous production of tubing.

FIGS. 9 and 10 illustrate a modified form of the spirally wound heating line type of tubing, using the thermo barrier layer 50 aforedescribed in connection with FIGS. 6 and 7; also there has been provided a plurality of heating lines 12b spirally wrapped around the sampling line 10.

The composite tubing of the invention enjoys greatly reduced costs of installation, as compared to the custommade structures heretofore used, is of considerably less bulk and of a smaller cross section and lighter weight per foot, as compared to such prior arrangements, and a tubing which gives much more accurate and uniform results from samples taken thereby.

While the sampling and heating lines have been referred to as being metallic, it will be understood that such lines might be of non-metallic materials. For instance in those environments where desirable or possible, the sampling line could be formed of a polyamide material, such as nylon.

From the foregoing discussion and accompanying drawings, it will be seen that the invention provides a novel composite tubing comprising a heating line means and a sampling line means disposed in heat transferring relation, and about which is provided an insulating barrier jacketed with an outer flexible plastic sheath material for protecting the tubing against corrosion and weather, and wherein such tubing may be readily installed and handled, much more expeditiously as compared to custom-made arrangements.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A deformable, composite tubing product of indeterminate continuous length adapted to be severed into determinate lengths at the place of application for use as a fluid sampling device in transferring fluid from a point of sampling to a point of use comprising flexible, metallic, tubular heat conductive sampling line means, metallic, tubular heat conductive heating line means disposed in contiguous heat transferring engagement with said sampling line means, a flexible filler material disposed about said line means, a flexible thermo-barrier layer disposed in circumferential relationship around said filler material to provide a thermo-barrier covering for said tubular line means, and a flexible sheath of polymeric material disposed around said thermo-barrier layer to provide a unitary structure.

2. A composite tubing in accordance with claim 1, wherein said heating line means comprises a copper tube, and said sampling line means comprises a stainless steel tube.

3. A composite tubing in accordance with claim 1, wherein said heating line means is spirally wound about said sampling line means.

4. A composite tubing product in accordance with claim 1 wherein said thermo-barrier layer comprises an asbestos polyester tape.

5. A composite tubing product in accordance with claim 1, wherein said filler material comprises a plurality of heat transmitting flexible metallic wires of greater flexibility than said sampling line means disposed between and in heat transmitting engagemet with said sampling line means.

6. A composite tubing product in accordance with claim 1, wherein said filler material comprises a layer of fibrous material.

7. A composite tubing product in accordance with claim 1 wherein the thermo-barrier layer is relatively thin compared to the diameter of said tubing and held from the tubing by the filler means.

8. A deformable, composite tubing product of indeterminate continuous length adapted to be severed into determinate lengths at the place of application for use as a fluid sampling device in transferring fluid from a point of sampling to a point of use, comprising flexible, metallic heat conductive tubular sampling line means, flexible, metallic heat conductive tubular heating line means disposed in contiguous spiralled heat transferring engagement with said sampling line means, filler material disposed about said line means, a relatively thin thermo-barrier layer compared to the diameter of said tubing disposed in circumferential relationship around said filler material to heat insulate said tubular means from the exterior of the device, said filler means separating said thermo-barrier layer from said line means, and a flexible outer sheath of polymeric plastic material disposed around said flexible elements to provide a unitary structure.

9. A deformable composite tubing product in accordance with claim 8, wherein said thermo-barrier layer comprises an asbestos-polyester tape, wound spirally around said flexible elements.

10. A deformable composite tubing product in accordance with claim 8 wherein said sampling line means is stainless steel and said heating line means is copper.

11. A deformable composite tubing product of indeterminate continuous length adapted to be severed into determinate lengths at the place of application for use as a fluid sampling device in transferring fluid from a point of sampling to a point of use comprising, a tubular sampling line member, a tubular heating line member disposed in contiguous heat transferring engagement with said sampling line member, the contiguous relationship of said tubular line members providing a space on opposite sides thereof which extend throughout their axial length, a bundle of flexible, heat-transmitting metallic wires disposed in intimate contact with and to occupy substantially the entire area presented by the spaces on opposite sides of said tubular line members giving with said tubular line members, a thermo-barrier layer disposed in encompassing relationship around said tubular line members and said metallic wires to heat insulate said tubular line members from the exterior of said device, and an outer sheath of flexible polymeric material covering said thermo-barrier layer to provide a unitary structure.

12. A deformable composite tubing product in accordance with claim 11 wherein said sampling line member and said tubular heating line member are bendable and metallic and wherein said heating line member and said metallic wires are spiralled about said sampling line member.

References Cited by the Examiner

UNITED STATES PATENTS

| | | | |
|---|---|---|---|
| 51,017 | 11/1865 | Cate | 138—111 |
| 1,141,067 | 5/1915 | Lloyd | 138—111 |
| 1,718,978 | 7/1929 | Protzeller | 138—112 |
| 2,016,900 | 10/1935 | Humberstone | 156—428 |
| 2,187,470 | 1/1940 | Collins | 165—180 X |
| 2,539,886 | 1/1951 | Bisch | 165—180 X |
| 2,611,585 | 9/1952 | Boling | 165—154 X |
| 2,624,366 | 1/1953 | Pugh | 138—115 |
| 2,707,095 | 4/1955 | Parsons et al. | 138—111 X |
| 2,829,699 | 4/1956 | Pazan | 156—428 |
| 2,863,179 | 12/1958 | Gaugler | 220—9 |
| 2,906,317 | 9/1959 | Keyes | 138—149 X |
| 3,151,633 | 10/1964 | Shuman | 138—111 X |

FOREIGN PATENTS 627,031  7/1949  Great Britain.

LAVERNE D. GEIGER, *Primary Examiner.*

LEWIS J. LENNY, *Examiner.*

C. HOUCK, *Assistant Examiner.*